No. 768,934. PATENTED AUG. 30, 1904.
T. DUNCAN.
METERING SYSTEM.
APPLICATION FILED JUNE 6, 1904.
NO MODEL.
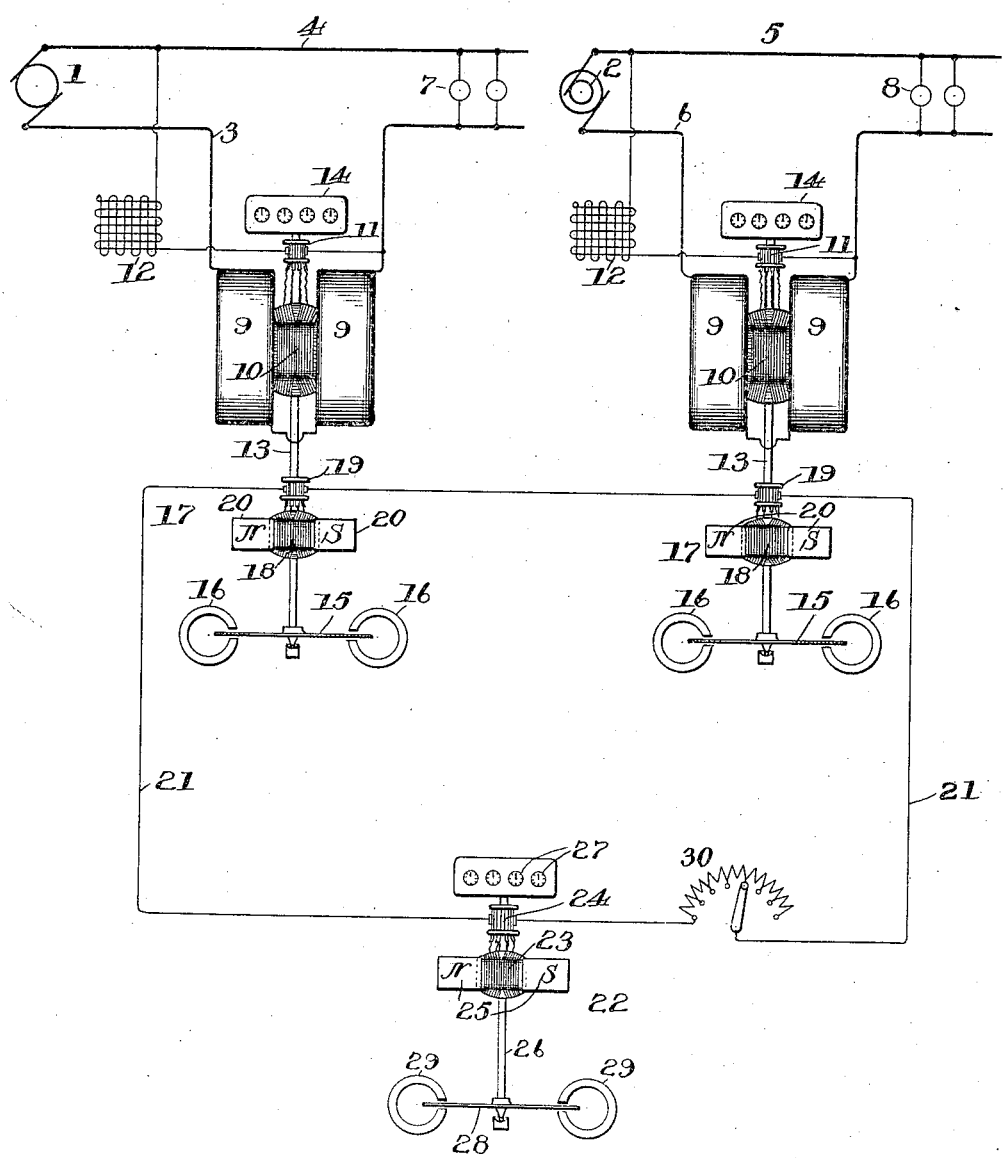
Witnesses:
C. H. Crawford
Leon Stroh
Inventor:-
Thomas Duncan
by G. L. Crago
His Attorney No. 768,934.

Patented August 30, 1904.

UNITED STATES PATENT OFFICE.

THOMAS DUNCAN, OF LAFAYETTE, INDIANA.

METERING SYSTEM.

SPECIFICATION forming part of Letters Patent No. 768,934, dated August 30, 1904.

Application filed June 6, 1904. Serial No. 211,247. (No model.)

*To all whom it may concern:*

Be it known that I, THOMAS DUNCAN, a citizen of the United States, residing at Lafayette, in the county of Tippecanoe and State of Indiana, have invented a certain new and useful Improvement in Metering Systems, of which the following is a full, clear, concise, and exact description, reference being had to the accompanying drawing, forming a part of this specification.

My invention relates to summation metering systems whereby the revolutions of a plurality of meters may be recorded or indicated by a single instrument, so that the entire output of a generator, a number of generators, or the output of the entire central station irrespective of the number of kinds of dynamos or generators and irrespective of the character of the current furnished may be measured by a single instrument, whether such single instrument is an indicating, integrating, or recording wattmeter or an indicating, integrating, or recording ammeter.

Hitherto it has been proposed to provide a special dial with each meter upon each circuit, which was connected by suitable wires to a dial-switchboard, so that individual readings of each meter could be noted on the switchboard, it, however, being necessary to add the separate dial-readings together in order to ascertain the total output.

In accordance with my invention I employ a motive device in conjunction with each generator or each circuit, as the case may require, this motive device being preferably the motor element of the particular meter thus associated with the generator or circuit, the speed of the motor being proportional to the watts or current that is to be measured, such a motor when forming a part of a meter serving to determine the output of the associated dynamo or generator or a circuit supplied thereby at any time. These motors or meters are caused to operate small generators whose armatures are desirably provided upon continuations of the shafts of the motors and whose fields are desirably constant in strength, whereby an external circuit including the armatures of these small generators is caused to be supplied with a pressure that is proportional to the total or additive measurements of the meters, thus operating the said small generators. These generators through the agency of the common circuit containing the same cause the operation of a summation-meter motor, whose armature is also in the said common circuit. I prefer to employ commutated windings for the small meter-operated generators and a commutated winding for the summation device, though I do not wish to be limited to this arrangement. It is apparent that it is immaterial whether the meter-motors that operate the small generators are themselves operated by alternating or direct current. Thus, if the said motor-meters are wattmeters, some operating by alternating current and some by continuous current or all by alternating current or all by continuous current, the small generators operated thereby would cause a summation device to indicate, totalize, or record the aggregate of the energy supplied to the various circuits in association with the operating motor-meters.

I will explain my invention more fully by reference to the accompanying drawing, which for sake of illustration shows a generator of direct current 1 for supplying one circuit and a generator of alternating current 2 for supplying another circuit. The generator 1 is in circuit with mains 3 and 4, and the generator 2 is in circuit with mains 5 and 6, translating devices 7 and 8 being supplied with current by these mains. The meter in circuit with the generator 1 and that in circuit with the generator 2 are wattmeters, the meter in circuit with the generator 2 being desirably a commutated meter, as this type of meter is well adapted to mixed systems in which alternating and direct current are furnished. The meters in both circuits being commutated meters, each preferably has its current or field winding subdivided into coils 9 9 in series with a supply-main and its pressure-winding subdivided into coils 10, connected with the segments of the commutator 11, included in bridge of the distribution-mains, in which beside the armature 10 there is desirably included an extraneous artificial resistance 12. The armature of each meter is mounted upon a shaft 13, which in this instance operates a recording-dial 14 and carries a retarding-disk 15, rotating within the fields furnished by the permanent magnet 16. The minor or summation generators 17 are pressure-generators, being preferably provided with commutated windings or armatures 18, whose coils are connected with the segments of the commutator 19, that work within constant magnetic fields that may be furnished by permanent magnets 20 of constant strength or by supersaturated electromagnets. The armatures 18 are driven by the motors of the meters supplied with operating-current by the generators 1 and 2, being preferably mounted upon extensions of the shafts 13 for the purpose. The various armatures of the summation-generators are included in an external circuit 21, in which circuit is also included the summation instrument 22, the instrument 22 indicated being in this instance a recording-wattmeter of the commutated type, the armature 23 of whose motor is supplied with the pressure furnished in the circuit 21 by the generators 17, the armature 23 for the purpose being subdivided into coils that are connected with the segments of a commutator 24, which are engaged by the brushes connected in the circuit 21. The field within which the armature 23 rotates is desirably of constant strength, and it may be furnished by means of a permanent magnet 25 of constant strength or by a supersaturated electromagnet. The shaft 26, carrying the armature 23, also operates the counting-dial 27 and is provided with a retarding-disk 28, arranged within the magnetic fields furnished by the permanent magnets 29. The extraneous artificial resistance or rheostat 30, included in the circuit 21, serves to regulate and determine the rate of operation of the armature 23, so that it may properly respond to the pressure impressed upon the circuit 21 to totalize the registrations of the primary meters in the circuits supplied by the generators 1 and 2.

The method of operation will be apparent. The revolutions of each armature 18 result in the development therein of an electromotive force proportional to the speed of the meter or motor operating the armature. In other words, as illustrated, this electromotive force will be proportional to the watts passing through the meter. By connecting this armature with suitable brushes and wires the armature 23 may be supplied with this pressure, whereby rotation of this armature is secured, and as the resistance of the armature 23 is constant the revolutions of this armature will be proportional to this impressed pressure. The armatures of the summation-generators by being included in the same circuit 21 cause electromotive force produced thereby to combine and effect an operation of the armature 23 proportioned to the sum of pressures furnished by the armatures 18, whereby the entire output of a plant or a plurality of generators or the entire energy in a plurality of circuits may be indicated upon one dial. It will be readily seen that the summation-circuit 21 is entirely independent of the total number of summation-generators, as the summation-meter will operate independently of the number of generators in operation.

It is obvious that changes may readily be made in the constructions illustrated without departing from the spirit of my invention, and I do not, therefore, wish to be limited to the precise embodiment illustrated; but,

Having thus described my invention, I claim as new and desire to secure by Letters Patent—

1. In a summation metering system, the combination with a plurality of generators, of a plurality of motors operating the same, a circuit supplied by said generators, and a summation-meter supplied by said circuit, substantially as described.

2. In a summation metering system, the combination with a plurality of generators, of a plurality of meters whose motor elements operate said generators, a circuit supplied by said generators, and a summation-meter supplied by said circuit, substantially as described.

3. The combination with a plurality of circuits, of a motor in each circuit, a generator operated by each motor, a circuit supplied by said generators, and a summation-meter supplied by said circuit, substantially as described.

4. The combination with a plurality of circuits containing alternating and direct current generators, of a motor in each circuit, a generator operated by each motor, a circuit supplied by said last generators, and a summation-meter supplied by said circuit, substantially as described.

5. In a summation metering system, the combination with a plurality of generators having commutated armatures, of a plurality of motors operating the same, a circuit including the armatures and commutators of said generators, and a summation-meter supplied by said circuit, substantially as described.

6. In a summation metering system, the combination with a plurality of generators having commutated armatures, of a plurality of meters whose motor elements operate said generators, a circuit including the armatures and commutators of said generators and a summation-meter supplied by said circuit, substantially as described.

7. The combination with a plurality of circuits, of a motor in each circuit, a generator having a commutated armature, a generator operated by each motor, a circuit including the armatures and commutators of said generators, and a summation-meter supplied by said circuit, substantially as described.

8. The combination with a plurality of circuits containing alternating and direct current generators having commutated armatures, of a motor in each circuit, a generator operated by each motor, a circuit including the armatures and commutators of said generators, and a summation-meter supplied by said circuit, substantially as described.

9. In a summation metering system, the combination with a plurality of generators, of a plurality of motors operating the same, a circuit supplied by said generators, and a summation-meter supplied by said circuit, the armature of the summation-meter being commutated and included in circuit with the armatures of the generators operated by said motors by its commutator and brushes, substantially as described.

10. In a summation metering system, the combination with a plurality of generators, of a plurality of meters whose motor elements operate said generators, a circuit supplied by said generators, and a summation-meter supplied by said circuit, the armature of the summation-meter being commutated and included in circuit with the armatures of the generators operated by said motors by its commutator and brushes, substantially as described.

11. The combination with a plurality of circuits, of a motor in each circuit, a generator operated by each motor, a circuit supplied by said generators, and a summation-meter supplied by said circuit, the armature of the summation-meter being commutated and included in circuit with the armatures of the generators operated by said motors by its commutator and brushes, substantially as described.

12. The combination with a plurality of circuits containing alternating and direct current generators, of a motor in each circuit, a generator operated by each motor, a circuit supplied by said last generator, and a summation-meter supplied by said circuit, the armature of the summation-meter being commutated and included in circuit with the armatures of the generators operated by said motors by its commutator and brushes, substantially as described.

13. In a summation metering system, the combination with a plurality of generators having commutated armatures, of a plurality of motors operating the same, a circuit including the armatures and commutators of said generators, and a summation-meter supplied by said circuit, the armature of the summation-meter being commutated and included in circuit with the armatures of the generators operated by said motors by its commutator and brushes, substantially as described.

14. In a summation metering system, the combination with a plurality of generators having commutated armatures, of a plurality of meters whose motor elements operate said generators, a circuit including the armatures and commutators of said generators, and a summation-meter supplied by said circuit, the armature of the summation-meter being commutated and included in circuit with the armatures of the generators operated by said motors by its commutator and brushes, substantially as described.

15. The combination with a plurality of circuits, of a motor in each circuit, a generator having a commutated armature, a generator operated by each motor, a circuit including the armatures and commutators of said generators, and a summation-meter supplied by said circuit, the armature of the summation-meter being commutated and included in circuit with the armatures of the generators operated by said motors by its commutator and brushes, substantially as described.

16. The combination with a plurality of circuits containing alternating and direct current generators having commutated armatures, of a motor in each circuit, a generator operated by each motor, a circuit including the armatures and commutators of said generators, and a summation-meter supplied by said circuit, the armature of the summation-meter being commutated and included in circuit with the armatures of the generators operated by said motors by its commutator and brushes, substantially as described.

17. In a summation metering system, the combination with a plurality of generators, of a plurality of motors operating the same, a circuit supplied by said generators, and a summation-meter supplied by said circuit, the armatures of the generators operated by said motors and the summation-motor being provided with magnetic fields of constant strength, substantially as described.

18. In a summation metering system, the combination with a plurality of generators, of a plurality of meters whose motor elements operate said generators, a circuit supplied by said generators, and a summation-meter supplied by said circuit, the armatures of the generators operated by said motors and the summation-motor being provided with magnetic fields of constant strength, substantially as described.

19. The combination with a plurality of circuits, of a motor in each circuit, a generator operated by each motor, a circuit supplied by said generators, and a summation-meter supplied by said circuit, the armatures of the generators operated by said motors and the summation-motor being provided with magnetic fields of constant strength, substantially as described.

20. The combination with a plurality of circuits containing alternating and direct current generators, of a motor in each circuit, a generator operated by each motor, a circuit supplied by said last generators, and a summation-meter supplied by said circuit, the armatures of the generators operated by said motors and the summation-motor being provided with magnetic fields of constant strength, substantially as described.

21. In a summation metering system, the combination with a plurality of generators having commutated armatures, of a plurality of motors operating the same, a circuit including the armatures and commutators of said generators, and a summation-meter supplied by said circuit, the armatures of the generators operated by said motors and the summation-motor being provided with magnetic fields of constant strength, substantially as described.

22. In a summation metering system, the combination with a plurality of generators having commutated armatures, of a plurality of meters whose motor elements operate said generators, a circuit including the armatures and commutators of said generators, and a summation-meter supplied by said circuit, the armatures of the generators operated by said motors and the summation-motor being provided with magnetic fields of constant strength, substantially as described.

23. The combination with a plurality of circuits, of a motor in each circuit, a generator having a commutated armature, a generator operated by each motor, a circuit including the armatures and commutators of said generators, and a summation-meter supplied by said circuit, the armatures of the generators operated by said motors and the summation-motor being provided with magnetic fields of constant strength, substantially as described.

24. The combination with a plurality of circuits containing alternating and direct current generators having commutated armatures, of a motor in each circuit, a generator operated by each motor, a circuit including the armatures and commutators of said generators, and a summation-meter supplied by said circuit, the armatures of the generators operated by said motors and the summation-motor being provided with magnetic fields of constant strength, substantially as described.

25. In a summation metering system, the combination with a plurality of generators, of a plurality of motors operating the same, a circuit supplied by said generators, and a summation-meter supplied by said circuit, the armature of the summation-meter being commutated and included in circuit with the armatures of the generators operated by said motors by its commutator and brushes, the armatures of the generators operated by said motors and the summation-motor being provided with magnetic fields of constant strength, substantially as described.

26. In a summation metering system, the combination with a plurality of generators, of a plurality of meters whose motor elements operate said generators, a circuit supplied by said generators, and a summation-meter supplied by said circuit, the armature of the summation-meter being commutated and included in circuit with the armatures of the generators operated by said motors by its commutator and brushes, the armatures of the generators operated by said motors and the summation-motor being provided with magnetic fields of constant strength, substantially as described.

27. The combination with a plurality of circuits, of a motor in each circuit, a generator operated by each motor, a circuit supplied by said generators, and a summation-meter supplied by said circuit, the armature of the summation-meter being commutated and included in circuit with the armatures of the generators operated by said motors by its commutator and brushes, the armatures of the generators operated by said motors and the summation-motor being provided with magnetic fields of constant strength, substantially as described.

28. The combination with a plurality of circuits containing alternating and direct current generators, of a motor in each circuit, a generator operated by each motor, a circuit supplied by said last generator, and a summation-meter supplied by said circuit, the armature of the summation-meter being commutated and included in circuit with the armatures of the generators operated by said motors by its commutator and brushes, the armatures of the generators operated by said motors and the summation-motor being provided with magnetic fields of constant strength, substantially as described.

29. In a summation metering system, the combination with a plurality of generators having commutated armatures, of a plurality of motors operating the same, a circuit including the armatures and commutators of said generators, and a summation-meter supplied by said circuit, the armature of the summation-meter being commutated and included in circuit with the armatures of the generators operated by said motors by its commutator and brushes, the armatures of the generators operated by said motors and the summation-motor being provided with magnetic fields of constant strength, substantially as described.

30. In a summation metering system, the combination with a plurality of generators having commutated armatures, of a plurality of meters whose motor elements operate said generators, a circuit including the armatures and commutators of said generators, and a summation-meter supplied by said circuit, the armature of the summation-meter being commutated and included in circuit with the armatures of the generators operated by said motors by its commutator and brushes, the armatures of the generators operated by said motors and the summation-motor being provided with magnetic fields of constant strength, substantially as described.

31. The combination with a plurality of circuits, of a motor in each circuit, a generator having a commutated armature, a generator operated by each motor, a circuit including the armatures and commutators of said generators, and a summation-meter supplied by said circuit, the armature of the summation-meter being commutated and included in circuit with the armatures of the generators operated by said motors by its commutator and brushes, the armatures of the generators operated by said motors and the summation-motor being provided with magnetic fields of constant strength, substantially as described.

32. The combination with a plurality of circuits containing alternating and direct current generators having commutated armatures, of a motor in each circuit, a generator operated by each motor, a circuit including the armatures and commutators of said generators, and a summation-meter supplied by said circuit, the armature of the summation-meter being commutated and included in circuit with the armatures of the generators operated by said motors by its commutator and brushes, the armatures of the generators operated by said motors and the summation-motor being provided with magnetic fields of constant strength, substantially as described.

In witness whereof I hereunto subscribe my name this 3d day of June, A. D. 1904.

THOMAS DUNCAN.

Witnesses:
   JOHN E. DALTON,
   JOHN R. PFROMMER.